US006937924B1

(12) United States Patent
Statler et al.

(10) Patent No.: US 6,937,924 B1
(45) Date of Patent: Aug. 30, 2005

(54) IDENTIFICATION OF ATYPICAL FLIGHT PATTERNS

(75) Inventors: Irving C. Statler, Mountain View, CA (US); Thomas A. Ferryman, Richland, WA (US); Brett G. Amidan, Kennewick, WA (US); Paul D. Whitney, Richland, WA (US); Amanda M. White, Kennewick, WA (US); Alan R. Willse, Richland, WA (US); Scott K. Cooley, Kennewick, WA (US); Joseph Griffith Jay, Corvallis, OR (US); Robert E. Lawrence, Los Altos, CA (US); Chris Mosbrucker, Corvallis, OR (US); Loren J. Rosenthal, Los Gatos, CA (US); Robert E. Lynch, San Carlos, CA (US); Thomas R. Chidester, Mountain View, CA (US); Gary L. Prothero, Corvallis, OR (US); Adi L. Andrei, Corvallis, OR (US); Timothy P. Romanowski, Corvallis, OR (US); Daniel E. Robin, Corvallis, OR (US); Jason W. Prothero, Corvallis, OR (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/857,376

(22) Filed: May 21, 2004

(51) Int. Cl.[7] ........................ G04B 47/06; G05D 1/00; G06F 7/70

(52) U.S. Cl. ........................ 701/14; 701/214; 244/184

(58) Field of Search ........................ 701/14, 214, 207, 701/213, 3, 4, 16, 200; 244/184, 203, 158 R, 244/75 R; 73/178 R, 488

(56) References Cited

U.S. PATENT DOCUMENTS

| | | | | |
|---|---|---|---|---|
| 4,235,104 | A * | 11/1980 | Hoadley et al. | 73/180 |
| 5,796,612 | A * | 8/1998 | Palmer | 701/4 |
| 5,991,691 | A * | 11/1999 | Johnson | 701/214 |
| 6,389,333 | B1 * | 5/2002 | Hansman et al. | 701/3 |
| 6,449,573 | B1 * | 9/2002 | Amos | 702/98 |

* cited by examiner

*Primary Examiner*—Thomas G. Black
*Assistant Examiner*—Dalena Tran
(74) *Attorney, Agent, or Firm*—John F. Schipper; Robert M. Padilla

(57) ABSTRACT

Method and system for analyzing aircraft data, including multiple selected flight parameters for a selected phase of a selected flight, and for determining when the selected phase of the selected flight is atypical, when compared with corresponding data for the same phase for other similar flights. A flight signature is computed using continuous-valued and discrete-valued flight parameters for the selected flight parameters and is optionally compared with a statistical distribution of other observed flight signatures, yielding atypicality scores for the same phase for other similar flights. A cluster analysis is optionally applied to the flight signatures to define an optimal collection of clusters. A level of atypicality for a selected flight is estimated, based upon an index associated with the cluster analysis.

17 Claims, 6 Drawing Sheets

IDENTIFICATION OF ATYPICAL FLIGHT PATTERNS

ORIGIN OF THE INVENTION

The invention described herein was made by employees of the United States Government and its contractors under Contract No. NAS2-99091 and may be manufactured and used by or for the Government for governmental purposes without the payment of any royalties thereon or therefor.

TECHNICAL FIELD

This invention relates to digital flight data processing that have been recorded on aircraft during flight operations.

BACKGROUND OF THE INVENTION

On a typical day, as many as 25,000 aircraft flights occur within the United States, and several times that number occur throughout the world. Most of these flights are safe. A few might exhibit safety issues. Many aircraft are equipped with instrumentation that collects from a few dozen parameters to a few thousand parameters every second for the full duration of the flight. These types of data have long been used for crash investigations but can also be used for routine monitoring of flight operations. The subject invention relates to the latter activity. This provides an opportunity to analyze this data to identify portions of flights that exhibit safety issues. Aviation experts review these flights and recommend appropriate actions as a result.

Flight data, recorded during aircraft flight, consist of a series of parameter values. Each parameter describes a particular aspect of flight. Some parameters relate to continuous data such as altitude and airspeed. Other parameters assume a relatively small number of discrete values (e.g., two or three), such as thrust reverser position or flight guidance or autopilot command mode. Parameter measurements are usually made once per second although they may be recorded more or less frequently. Hundreds or even thousands of parameters may be collected for each second of an entire flight. These data are recorded for thousands of flights. The resulting data for an even modest size set of flights are voluminous.

Conventional methods of finding anomalous flights in bodies of digital flight data require users to pre-define the operational patterns that constitute unwanted performances. This can be a hit-or-miss process, requiring the experience and knowledge of experts in aviation operations, and it only identifies occurrences that specifically match the pre-defined condition. A conventional flight data analysis tool will find the patterns it is told to look for in flight data, but the tool is blind to newly emergent patterns for which the tool has not been programmed to look. The invention overcomes this deficiency because it does not require any pre-specification of what to look for in bodies of flight data.

Naturally most flights are typical and exhibit no safety issues. A very few flights stand out as atypical based values displayed by the data. These flights may be atypical due to one flight parameter being very unusual or multiple parameters being moderately unusual. It turns out that these unusual flights often exhibit safety issues and thus are of interest to identify and refer to aviation safety experts for review. Additionally, these atypical flights might display safety issues in a manner never envisioned by safety experts; hence impossible to find using pre-defined exceedences as done by the current state of the practice.

What is needed is an approach that allows identification of the most important flight parameters, capture and characterization of the dynamic values of these important parameters, and application of a consistent analysis to identify aircraft flights which exhibit atypical characteristics. This could mean that one or more of these parameters exhibits atypical values with respect to a collection of a set of flights that collectively define "typical". This could also mean that individual parameters were marginally atypical, but collectively atypical. The analysis must be extendable to a larger or smaller number of "important" parameters and should not depend upon choice of a fixed number of such parameters. The analysis allows the identification of atypical flights without limiting the nature of the atypicalities to envisionable or pre-defined conditions.

In summary, the current state of the art is to monitored flight data for specified exceedences (excessive speed, g-forces, and other easily definable characteristics that differ from standard operating procedures). This invention goes beyond that by detecting unusual events, statistical patterns, and trends without requiring the pre-definition of what to look for and without limiting the investigation to a small number of parameters. It does this by applying multivariate statistical/mathematical methods.

SUMMARY OF THE INVENTION

These needs are met by the invention, which provides an approach: (1) to provide a set of time varying flight parameters that are "relevant;" (2) to transform this set of flight parameters into a minimal orthogonal set of transformed flight parameters; (3) to analyze values of each of these transformed flight parameters within a time interval associated with the flight phase; (4) to apply these analyses to the data for each aircraft flight; and (5) to identify flights in which the multivariate nature of these transformed flight parameters is atypical, according to a consistently applied procedure.

Digital flight data are passed through a series of processing steps to convert the massive quantities of raw data, collected during routine flight operations, into useful information such as that described above. The raw data are progressively reduced using both deterministic and statistical methods. In the final stages of processing, statistical methods are used to identify flights to be reviewed by aviation experts, who infer key safety and operational information about the flights described in the data. These flight data processing methods are imbedded in software.

The analysis begins with a selected subset of relevant flight parameters, each of which is believed to potentially characterize the nature of a selected aircraft's flight (q), for a selected phase (ph) of the flight (e.g., pre-takeoff taxi, pre-takeoff position, takeoff, low altitude ascent, high altitude ascent, cruise, high altitude descent, low altitude descent, runway approach, touchdown and post-touchdown taxi.). Application of this criterion often reduces the number of flight parameters from a few thousand to a number as low as about 100, or lower if desired, referred to herein as underlying flight parameters ("FPs"). The data value for each record and for each FP is inspected to determine if the data are reasonable and should be used to characterize the nature of the aircraft's flight or if it is "bad" data that has been corrupted. If the data value is deemed "bad" then it is removed from the analysis process for those records that it is deemed bad.

The (remaining) sequence of received FP values is analyzed separately for parameters that are interval ratio continuous numbers and for parameters that are ordinal or categorical parameters, sometimes referred to as discrete value parameters. A continuous value parameter value is approximated in each of a sequence of overlapping time intervals as a polynomial (e.g., quadratic or cubic), plus an error term. Each of the sequence of approximation coefficients for the sequence of time intervals is characterized by a first order statistic, a second order statistic, a minimum value and a maximum value, and, optionally, by at least one of a beginning value and an ending value for the sequence. The discrete value parameters are analyzed and characterized in terms of proportion of time at each discrete value and number of transitions between discrete values. The continuous value and discrete value characterization parameters are combined as an Mx1 vector E for each flight. The set of flights is combined to form a matrix for which a covariance matrix F is computed.

An eigenvalue equation, $F \cdot V(\lambda)=\lambda V(\lambda)$, is solved. The data matrix formed by combining the Mx1 vectors E for the set of flights is transformed by a data matrix to form a new matrix G. The set of all eigenvalues can be, and preferably will be, replaced by a reduced set of eigenvalues having the largest values.

A cluster analysis is performed on the new matrix G, with each flight being assigned to one of the clusters. The Mahalanobis distance for the flight with respect to the mean of all the flights (based on the G matrix) forms an estimate of the atypicality score for each flight, q, in each phase, ph. This atypicality score for flight q and phase ph is combined with the proportion of flights in the cluster flight q/phase ph was associated to calculate a new atypicality value, referred to as a Global Atypicality Score (GAS).

The Global Atypicality Scores for all the flights are ranked in decreasing order. The flights in the top portion (typically 5%) are labeled "atypical" ("Level 2" and "Level 3") and the most atypical of these flights are identified as "Level 3". These flights are brought to the user's attention in a list. The user can select any of these flights and drill down to get additional information about the flight, including comparison of its parameter values to the values of other flights.

DESCRIPTION OF BEST MODES OF THE INVENTION

Figure 1:
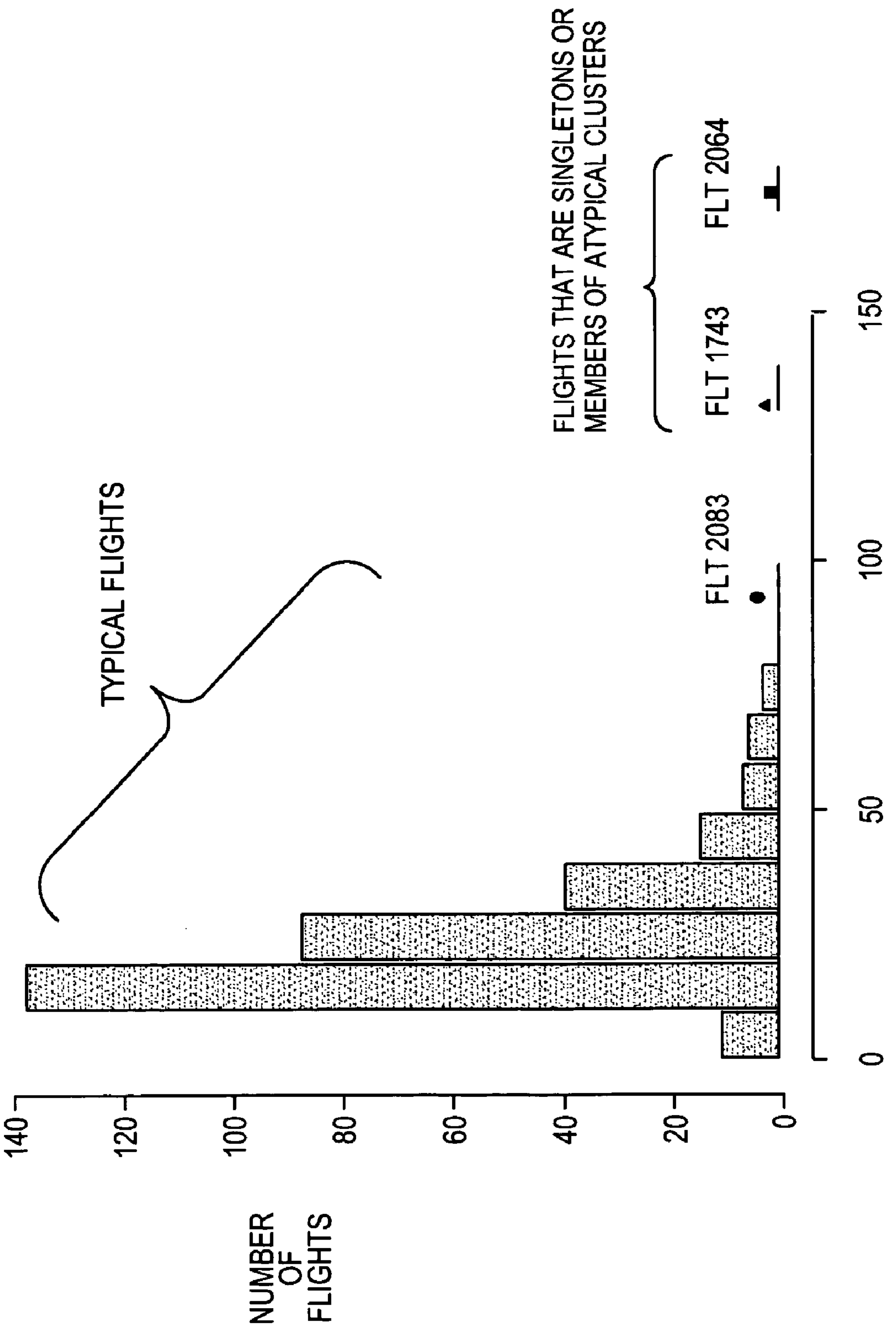
FIG. 1 is a histogram of a representative group of flights, illustrating the appearance of two statistical outliers for fictitious flights.

A sequence of values for each of a selected set of P relevant flight parameters FP is received, and unacceptable values are removed according to one or more of the following: (1) each value $u_n$ of a sequence is compared with a range of acceptable values, $U1 \leqq u \leqq U2$, and if the parameter value $u_n$ lies outside this range, this value is removed from the received sequence; and (2) a first difference of two consecutive values, $u_{n-1}$, and $u_n$, is compared with a range of acceptable first differences, $\Delta_1 U1 \leqq u_n - u_{n-1} \leqq \Delta_1 U2$, and if the computed first difference lies outside this range, at least one of the values, $u_{n-1}$, and un, is removed from the received sequence.

For continuous value parameters, each such parameter is analyzed by applying a time-based function over each of a sequence of partly overlapping time intervals $(t_{n0}, t_{n0+N-1})$ of substantially constant temporal length (N values) to develop, for each such time interval and for each FP, a polynomial approximation in a time variable t, plus an error coefficient. For example, the polynomial may be a quadratic sum, such as $$p(n0\backslash\backslash t;app) \approx p_0$$

$$(n_0)+p_1(n_0)\cdot(t-t_{n0})^2$$

$$+e(n0) \tag{1A}$$

$$d(n0) = (N-3)^{-1} \sum_{n=n0}^{N+n0-1} e(n)^2, \tag{1B}$$

including an error coefficient e(n0) that (i) is minimized for each time interval, $t_{n0} \leqq t \leqq t_{n0+N-1}$, by appropriate choice of the coefficients $p_0$, $p_1$ and $P_2$ and (ii) reflects how closely the actual FP data are approximated by the corresponding time dependent polynomial for the corresponding time interval.

For the sequence of time intervals in the selected phase for the selected FP, each of the sequence of coefficients $\{p_0(n0)\}_{n0}$, $\{p_1(n0)\}_{n0}$, $\{p_2(n0)\}_{n0}$ and $\{d(n0)\}_{n0}$, considered as a vector v of entries, is characterized by characterization parameters, which include a first order statistic m1(v) (e.g., weighted mean, weighted median, mode), by a second order statistic m2(v) (e.g., standard deviation), by a minimum value min(v), by a maximum value max(v), and optionally by a beginning value begin(v) and/or by an ending value end(v) for that coefficient sequence. The collection of these characterization parameters is formatted and stored as an M×1 vector E1, representing the collection of time intervals for that phase (ph) for that flight parameter for that flight (q).

Each ordinal or categorical parameter (sometimes referred to as a discrete-valued parameter), numbered k2=1, . . . , K2 and having L(k2) discrete states, is analyzed by forming a square transition matrix, with each row and each column representing each of the possible states or values of the parameter(s). Each data point from the full flight phase is processed by counting the number of transitions $N_{i,i+1}$ from a state $S_i$ on record i to an immediately subsequent state $S_{i+1}$ on record i+1, including the number of transitions of a state to itself. Each diagonal entry in this transition matrix is divided by the sum of the original diagonal values, to convert the matrix to an $L(k2)^2 \times 1$ vector $E_{k2}$, where L(k2) is the number of distinct values for this parameter, k2. The set of vectors $E2_{k2}$ for all the discrete parameters of the phase for this flight are concatenated into a vector E2, that is L×1, where L is the sum of $L(k2)^2$ over all k2=1, . . . , K2.

The discrete parameter vector(s) for each phase and for the phase ph is/are combined with the $M_1 \times 1$ vector E1 for continuous value parameters to form an M×1 row vector E (M=M1+L) that includes the contributions of continuous and discrete value parameters. The E vectors from each of the Q flights in the set selected to be studied are combined to form a matrix, denoted as DM. Optionally, vectors E for adjacent phases can be combined to perform a multiple phase analysis, if desired.

An M×M covariance matrix $$F=\mathrm{cov}(E) \quad (2)$$

is formed, which is symmetric and non-negative definite, and an eigenvalue equation $$F\cdot V(\lambda)=\lambda V(\lambda) \quad (3)$$

is solved to determine a sequence of $M=M_1+L$ eigenvalues $\lambda_i$ with $\lambda_1 \geqq \lambda_2 \geqq \lambda_M \geqq 0$. The eigenvalue equation (3) can be solved in a straightforward manner, or a singular value decomposition (SVD) approach can be used, as described by Kennedy and Gentle in Statistical Computing, Marcel Dekker, Inc., 1980 pp 278–286, or in any other suitable numerical analysis treatment. (The method used is equivalent to what is known as principle component analysis.) One works with a selected subset $\{\lambda'_i\}$ of these eigenvalues, which may be a proper subset of M' eigenvalues ($M' \leqq M$), where $$\sum_{i=1}^{M'} \lambda'_i \geq f \cdot \sum_{i=1}^{M} \lambda_i, \quad (4)$$

and f is a selected fraction satisfying $0<f\leqq 1$ for example, f=0.8 or 0.9.

A transformed matrix $$G=DM\cdot F \quad (5)$$

is then computed. Preferably, the matrix G is normalized by subtraction of a first order statistic of each column and by division of the difference by a second order statistic associated with that column.

An atypicality score, also referred to as a Mahalanobis distance, $$A_q = (1/(M'-3))\sum_{j=1}^{M'} (G'_{gj})^2/\lambda'_j \quad (6)$$

is computed for each flight (q) and each phase (ph).

The atypicality scores for the selected set of flights can be compared using a histogram of reference atypicality scores for a collection of reference flights. An atypical flight will often appear as a statistical outlier, as illustrated in FIG. 1 for two fictitious flights "2064" and "1743". This one dimensional approach has the advantage of simplicity of interpretation.

A p-value, corresponding to an atypicality score $A_q$, the selected flight q and the selected phase ph, is defined using the Wishart probability density distribution as defined in Anderson, *An Introduction to Multivariate Statistical Analysis, 2nd Edition*, John Wiley & Sons, 1984, pg 244–255.

$$p(q;ph)=(F1\cdot F2)/(F3\cdot F4\cdot F5) \quad (7A)$$

where $$F1=|A_q|^{(R-M-1)} \quad (7B)$$

$$F2=\exp(-(1/2)\ \mathrm{trace}(\Sigma^{-1}A_q)) \quad (7C)$$

$$F3=2^{-MR}*\pi^{M(M-1)/4}, \quad (7D)$$

$$F4=|\Sigma|^{1/2R}, \quad (7E)$$

$$F5=\Pi^{M}_{i=1}\Gamma((1/2)\ (R+1-i)) \quad (7F)$$

Γ(x) is an incomplete gamma function.

A cluster analysis is applied to a collection of observed values G (from Eq. (5)) for the same phase and for the full set of selected flight(s). A preferred cluster analysis is K-means analysis, as set forth in any of a number of statistics and data mining books, including Kennedy, Lee, Roy, Reed and Lippman, *Solving Data Mining Problems Through Pattern Recognition*, Prentice Hall PTR, 1995–1997, page 10–50 through 10–53. The clustering is performed for each phase (or aggregated group of phases) separately.

The initialization step requires selection of the number K of clusters, and the setting of the initial seed values. There are a number of ways to set these seeds; including using (i) a random selection of K flight vectors U from the full set of flight vectors, (ii) a random selection of dimension values for each of the K flight vectors, (iii) setting the seeds to be all zeros in all dimension but one and that value is a maximum or minimum of that value among all flight vectors. There are many other ways as well. The first method is a preferred method. These seeds take the role as the initial values of the cluster centers or centroids.

The next step requires that the distance from each cluster centroid to each flight vector is calculated. A flight vector is associated with the cluster that has the minimum flight vector-to-center distance. There are numerous methods to calculate distance, including Euclidian distance, Manhattan distance and cosine methods. A preferred method is the Euclidean distance.

After associating every flight vector U with a cluster, the centroid for each cluster k is calculated as the mean or first order statistic in each dimension of the flight vectors that are associated with cluster k.

These last two steps are repeated until the number of flight vectors changing cluster membership is below some threshold or an upper limit of number of iterations is reached.

A second preferred cluster analysis method is hierarchical clustering, which works with partitions of the collection of observations that are built up (agglomerations) or that are divided more finely (divisions) at each stage. Hierarchical methods are discussed by B. S. Everitt, ibid, pp. 55–89. Other cluster analysis can also be performed using any of the approaches set forth in B. S. Everitt, pp 37–140.

Hierarchical clustering initially assigns each flight, q=1, . . . , Q, to its own cluster, c=1, . . . C. Then the "distance" between all possible flight vectors pairs is calculated using the G matrix and identify the two flight vectors with the minimum distance. There are numerous methods to calculate distance, including Euclidian distance, Manhattan distance and cosine methods. A preferred method is the Euclidean distance. These flight vectors are associated with a cluster. The cluster's centroid is calculated based on all its members, denoted by cc, 1, . . . , CC.

After the first cluster is formed, calculate the distance between all possible pairs from Q-1 objects (Q-2 flight vectors and 1 cluster), find the pair with the minimum distance and assign them to a cluster. This may be a pair of flight vectors or a flight vector with a cluster (and if there are multiple clusters, as there inevitably will be, it could be two clusters jointed to form one larger cluster). Continue this process of calculating distances, finding the minimum distance and assigning flights or clusters to form bigger clusters until all have been aggregated to one global cluster.

Figure 2:
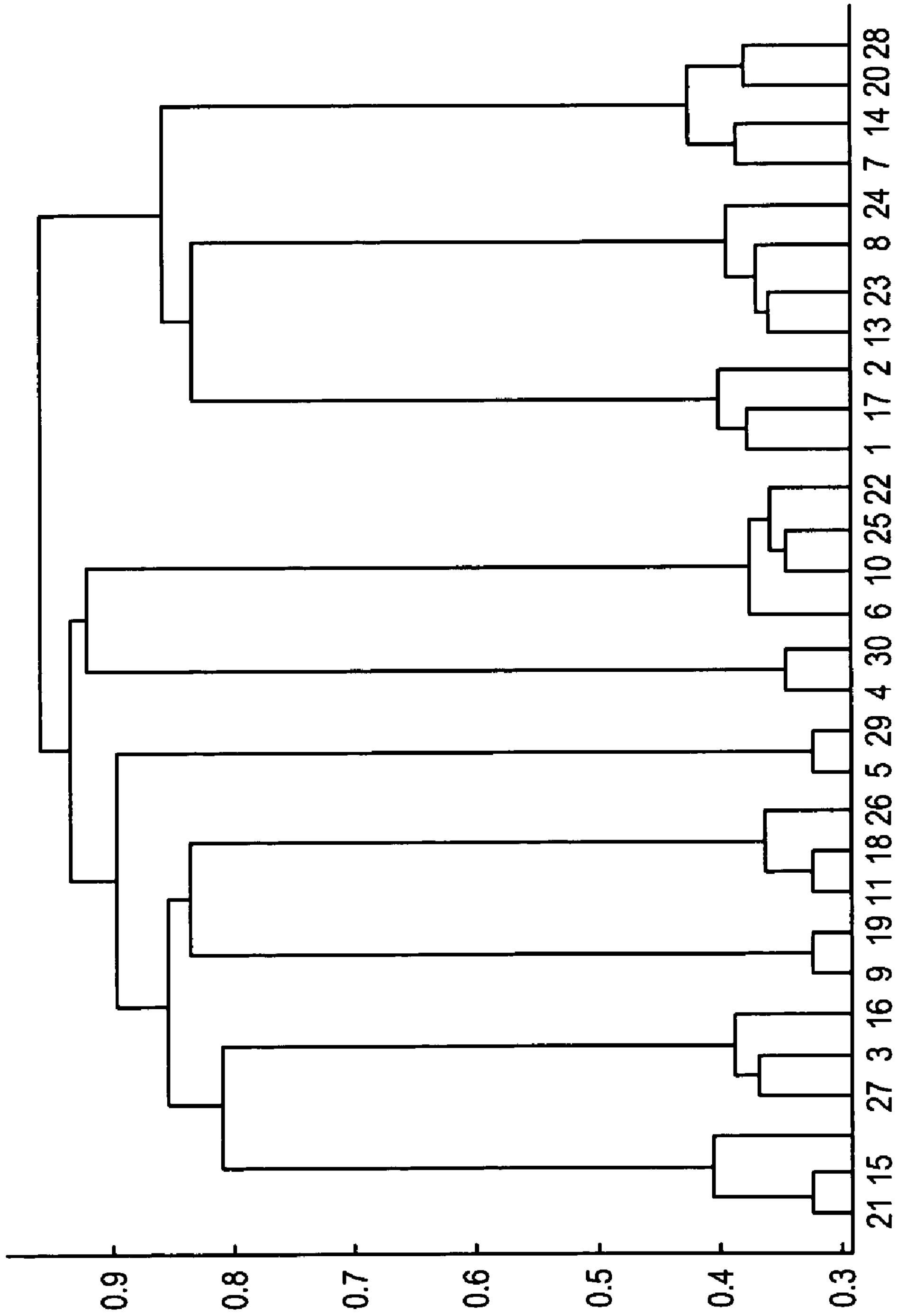
FIG. 2 illustrates a dendogram display of hierarchical clustering.

FIG. 2 illustrates this process graphically in a dendogram. The user has the option of how many clusters to use. One could choose any number from 2, . . . (Q-1). One could cut the dendogram horizontally to form K clusters or at different levels for different clusters. The options commonly used are: (1) to specify the number of clusters and cut horizontally, (2) to look for long vertical branches in the dendogram and cut horizontally at that level, (For FIG. 2 this would result in 10 clusters.), and (3) to calculate a index of cluster homogeneity as a function of the sum of the squares of within-cluster distances and between-cluster distances. A preferred method is the first. References to these and other acceptable techniques can be found in Webb, Andrew. Statistical Pattern Recognition. Oxford University Press Inc. New York. 1999. pages 308–310. or G. W. Milligan and M. C. Cooper. An examination of procedures for determining the number of clusters in a data set. Psychometrika, 50(2): 159–179, 1985.

A cluster membership score CMS(q;ph), equal to a monotonic function of a ratio, the number of observations in that cluster, divided by the total number of observations (0<CMS<1), is then computed for the selected flight (q) and the selected phase (ph). A larger value of CMS corresponds to a less atypical set of observed values for the selected flight (q) and the selected phase (ph), and inversely.

A Global Atypicality Score GAS for a selected flight (q) and selected phase (ph) is then defined as $$GAS(q;ph)=-\log_z\{p(q;ph)\}-\log_z\{CMS(q;ph)\}, \quad (8)$$

where z is a selected real number greater than 1. According to the definition in Eq. (8), a Global Atypicality Score GAS increases with decreasing p-values and with decreasing CMS values. A probability value Pr can be assigned to each GAS value that decreases with an increase in the GAS value. The logarithm functions in Eq. (8) can be replaced by another function Fn that is monotonic in the argument, such as $$GAS(q;ph)=w1\cdot Fn\{p(q;ph)\}$$
$$+(1-w)\cdot Fn\{CMS(q;ph)\}, \quad (9)$$

where w is a number lying in the range $0\leqq w\leqq 1$.

Figure 3A:
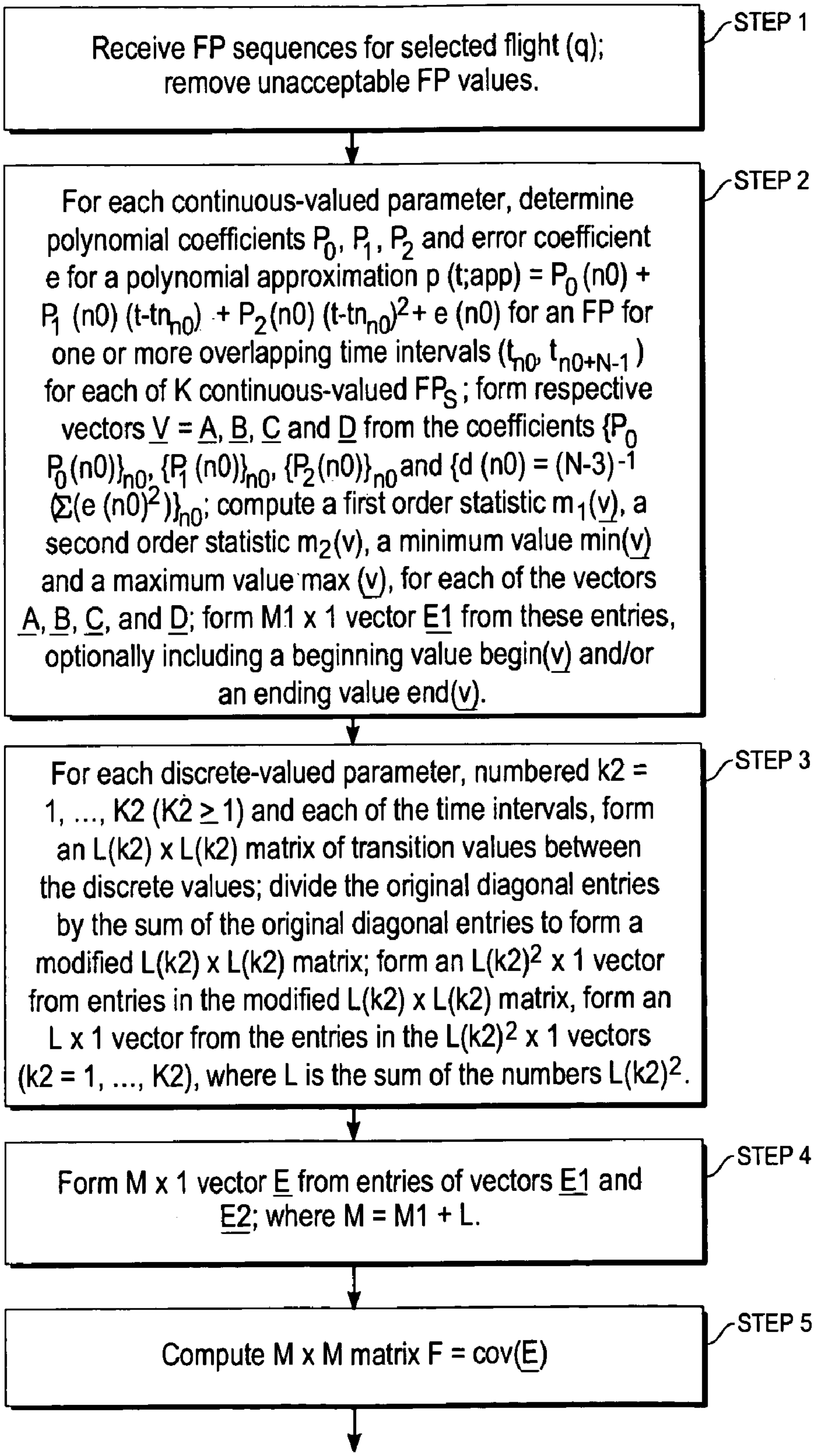
FIG. 3 is a flow chart of a procedure for practicing an embodiment of the invention.
Figure 3B:
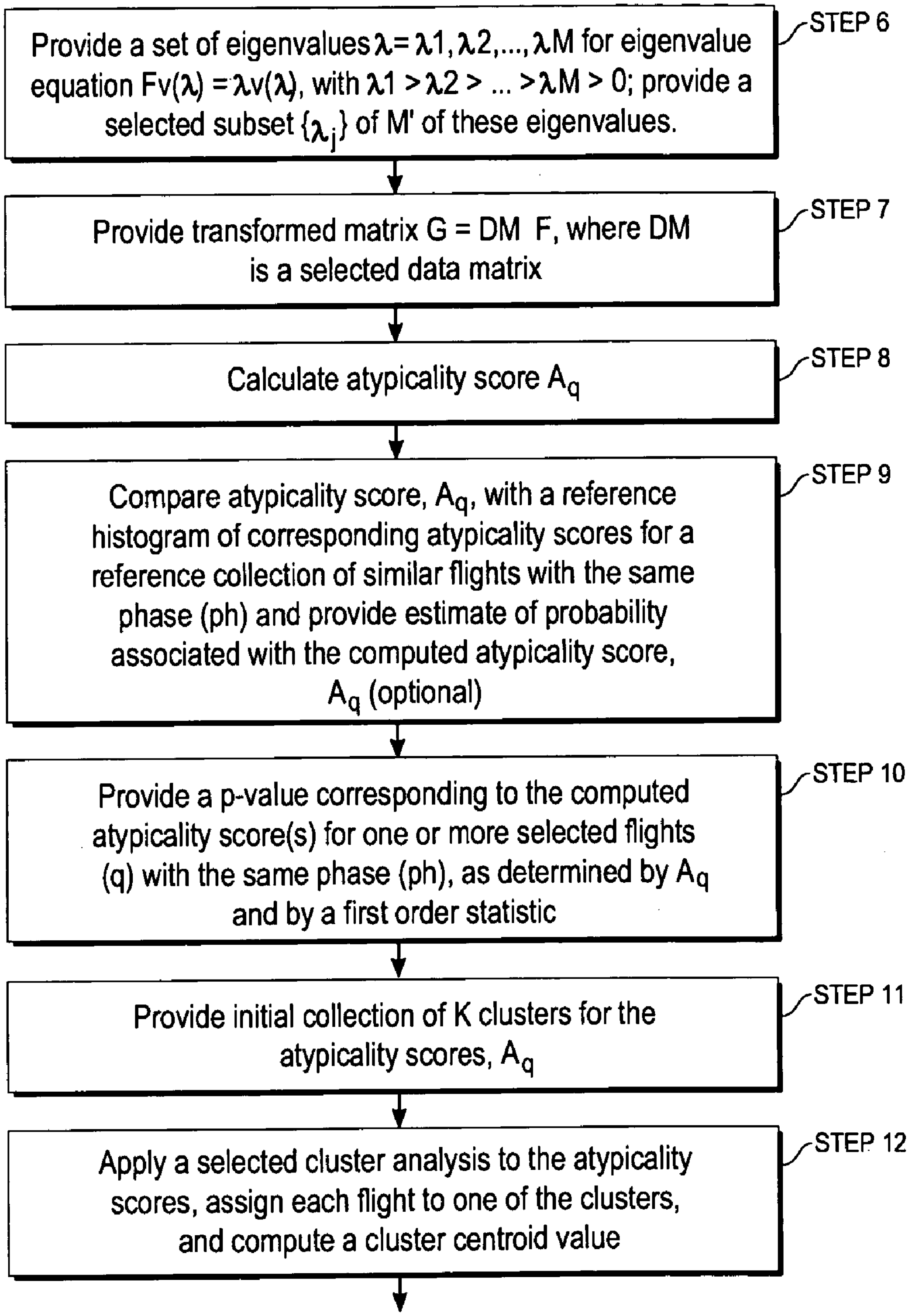
Figure 3C:
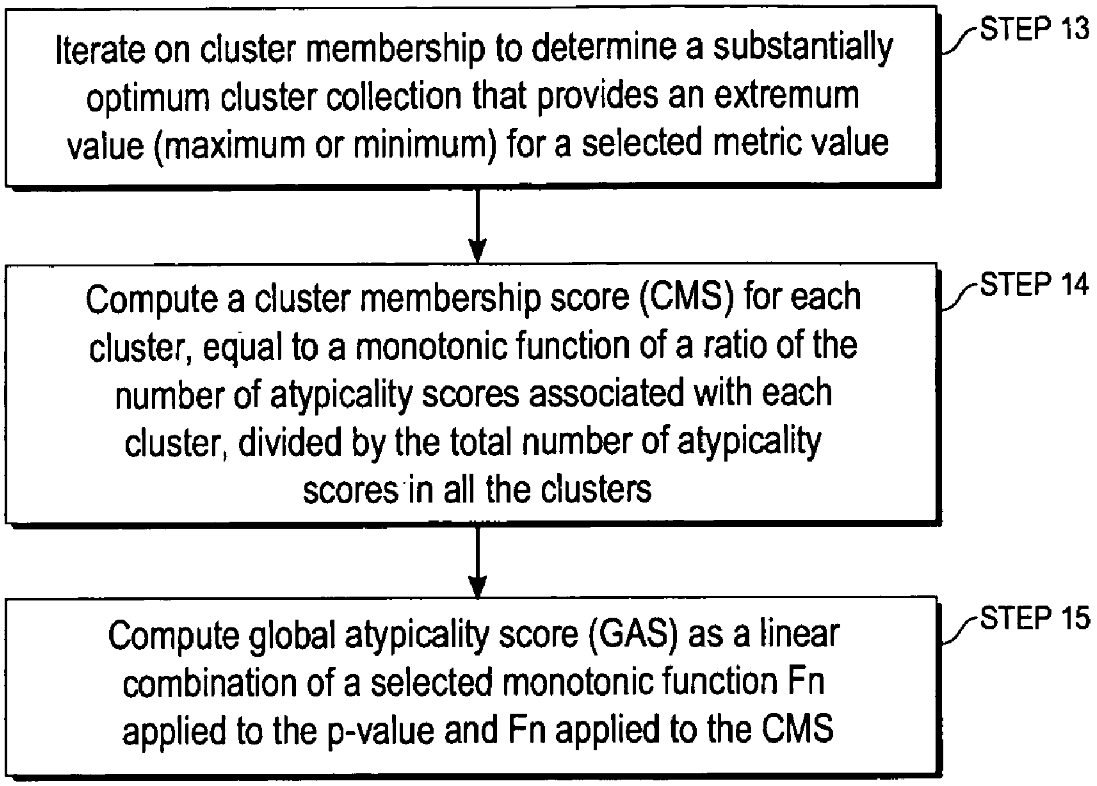

FIG. 3 is a flow chart of a procedure for practicing the invention. In step 1, one or more sequences of flight parameter (FP) values are received for a selected phase (ph) for a selected flight (q), for each of a sequence of overlapping time intervals, and unacceptable parameter values are identified and removed from one or more sequences.

In step 2, applicable to a parameter with continuous values, polynomial coefficients $p_0(n0)$, $p_1(n0)$ and $p_2(n0)$ and an error coefficient e(n0) are determined for a polynomial approximation $p(t;app)\approx p_0(n0)+p_1(n0)(t-t_n)+p_2(n0)(t-t_n)^2+e(n0)$, where the coefficients $p_0$, $p_1$ and $P_2$ are chosen to minimize the magnitude of e. The collections of coefficients $\{p_0(n0)\}_{n0}$, $\{p_1(n_0)\}_{n0}$, $\{p_2(n0)\}_{n0}$ and $(d(n0)=(N-3)^{-1}\Sigma e(n0)^2\}_n$ are treated as entries for the respective vectors v=A, B, C and D, for the selected flight (q) and the selected phase (ph). A first order statistic m1(v), a second order statistic m2(v), a minimum value min(v) and a maximum value max(v), and optionally at least one of a beginning value begin(v) and an ending value end(v), are computed for each of the vectors v=A, B, C and D. An M1×1 vector E1 is formed, including the entries of the vectors A, B, C and D.

In step 3, for each of the overlapping time intervals, an L(k2)×L(k2) matrix is formed whose entries are the number of transitions from one of L(k2) discrete values to another of these discrete values of an FP; each of the original diagonal values of the L(k2)×L(k2) matrix is divided by the sum of the original diagonal values so that the sum of the diagonal entries of this modified L(k2)×L(k2) matrix has the value 1. An L×1 vector E2 is formed from the entries of the modified L(k2)×L(k2) matrices, where L is the sum of the squares $L(k2)^2$.

In step 4, an M×1 vector E, including the entries of the vectors E1 and E2, is formed, where M=M1+L. In step 5, an M×M covariance matrix F=cov(E) is computed.

In step 6, eigenvalues λ for an eigenvalue equation, $F\cdot V(\lambda)=\lambda V(\lambda)$, are obtained, where $\lambda 1\geqq\lambda 2\geqq \ldots \geqq\lambda M\geqq 0$, and a selected subset of these eigenvalues, $\lambda'1\geqq\lambda'2\geqq \ldots \lambda'M'\geqq 0$, is provided, where $M'\geqq M$.

In step 7, a transformed matrix G=DM·F is provided, where DM is a selected data matrix.

In step 8, an atypicality score, Aq is calculated based on the M' variables for the selected set of flights and the selected phase (ph), as set forth in Eq. (6).

In step 9 (optional), the computed atypicality score, $A_q$, for the selected flight is compared with a reference histogram of corresponding atypicality scores for a reference collection of similar flights with the same phase (ph), and an estimate is provided of a probability associated with the computed atypicality score relative to the reference collection. Step 9 is a simplified alternative to cluster analysis, which is covered in steps 10–15.

In step 10, a p-value corresponding to the computed atypicality score is provided for the selected flight and/or for one or more similar flights with the same phase (ph), as determined by $A_q$.

In step 11, an initial collection of M'-dimensional clusters is provided for the atypicality scores, $A_q$.

In step 12, a selected cluster analysis, such as K-means analysis or hierarchical analysis, is performed for the cluster collection provided. Each atypicality score is assigned to one of the clusters, and a selected cluster metric value or index is computed.

In step 13, membership in the clusters is iterated upon to determine a substantially optimum cluster collection that provides an extremum value (minimum or maximum) for the selected cluster metric value or index.

In step 14, a cluster membership score (CMS) is computed for each cluster, equal to a monotonic function of a ratio, the number of observations (atypicality scores) associated with each cluster, divided by the total number of observations in all the clusters.

In step 15, a global atypicality score GAS is computed as a—a linear combination of a selected monotonic function Fn applied to the p-value and the selected function Fn applied to the CMS, for the selected flight(s) and the selected phase (ph).

Figure 4:
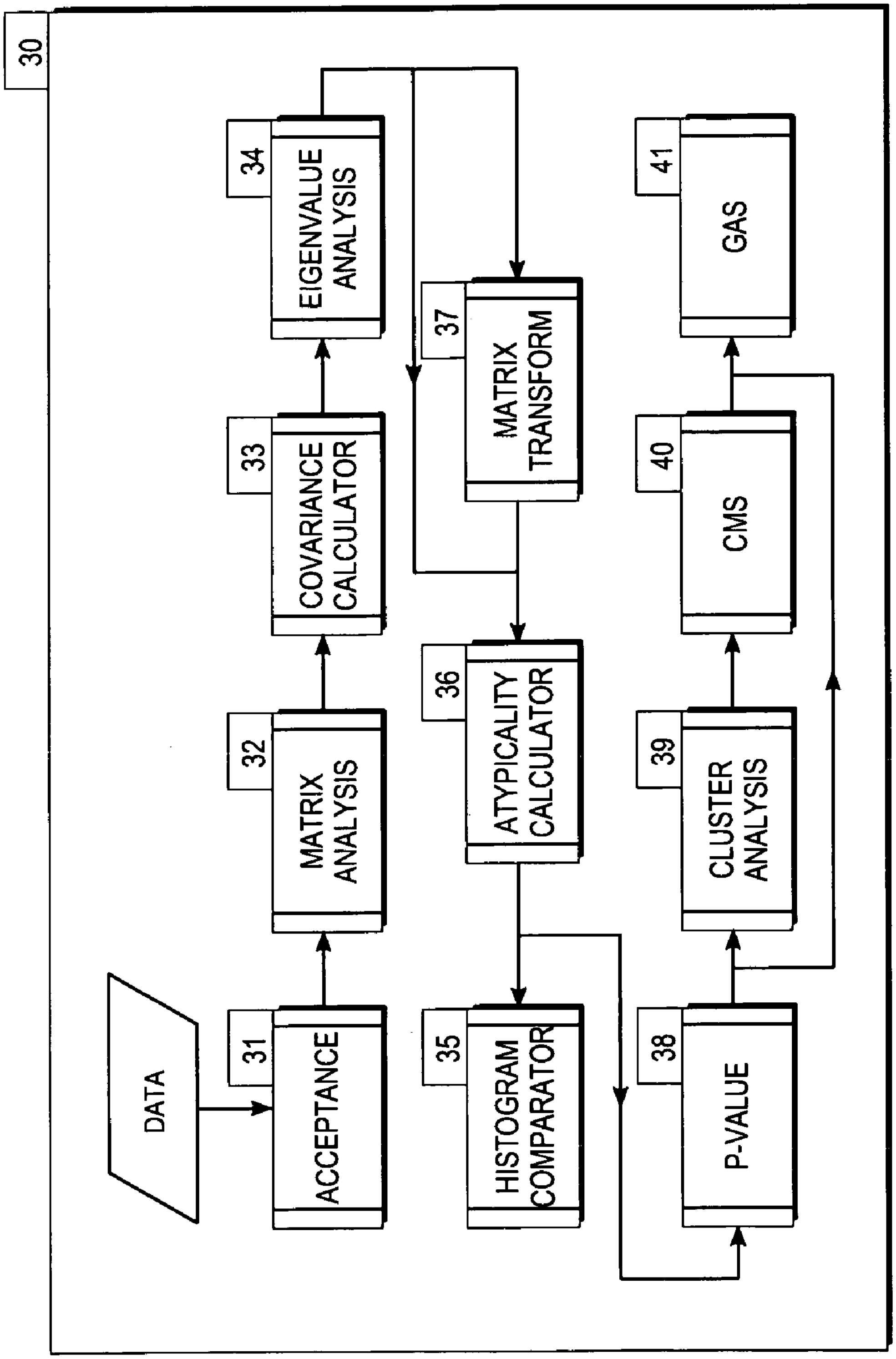
FIG. 4 is a schematic view of a system for practicing the invention.

FIG. 4 is a schematic view of a computer system 30 for practicing the invention. The sampled values (continuous and/or discrete) are received at an input terminal of an acceptance module 31 that performs step 1 (FIG. 3) and determines which sampled values are acceptable. The acceptable values are presented to a matrix analysis module 32, which (i) distinguishes between continuous and discrete parameter values and (ii) performs the polynomial approximation analysis and statistical analysis and (iii) forms the vectors E1, E2 and E, as in steps 2, 3 and 4. The vector E is received at a covariance calculation module 33, which generates and issues the matrix F=cov(E), as in step 5. The matrix F is received by an eigenvalue analyzer 34, which solves the eigenvalue equation, $F\cdot V(\lambda)=\lambda V(\lambda)$ and stores the eigenvalues $\lambda=\lambda 1, \ldots, \lambda M$, as in step 6. Optionally, the eigenvalue analyzer 34 identifies a selected subset of M' eigenvalues. A transformed matrix G=DM·F is formed in a matrix transformation module 35, as in step 7, where DM is a matrix of selected FP values. The eigenvalues λ'i and the entries of the transformed matrix G are received by an atypicality calculator 36, which calculates an atypicality score or flight signature, as in step 8. The atypicality score is optionally analyzed by a histogram comparator module 37, as in step 9.

A collection of one or more atypicality scores is received by a p-value module 38, which calculates a p-value for the collection, as in step 10 (FIG. 3). A cluster analysis module 39 receives the G matrix and determines an optimal assignment of each flight vector to one of K clusters. A cluster membership score (CMS) is computed by a CMS module 40, as in step 14. A GAS module 41 receives the p-value score(s) and the CMS score(s) and computes a global atypicality score (GAS), as in step 15.

A GAS value for a selected flight (q) and selected phase(s) (ph) may be compared with a spectrum of GAS values for a collection of reference flights for the same phase(s) to estimate a probability associated with the GAS for the selected flight. A GAS value for a selected flight may, for example, be placed in the most atypical 1 percent of all flights, in the next 4 percent of all flights, in the next 16 percent of all flights, or in the more typical remaining 80 percent of all flights.

Assume that the selected flight atypicality score is assigned to a given cluster, SFC. The GAS value for that selected flight will decrease as the CMS for the cluster SFC increases, and inversely. An increased CMS value for the SFC corresponds to enlargement of the SFC. The logarithm function $-\log_2(x)$ manifests increased sensitivity to change of the argument x as x approaches 0.

What is claimed is:

1. A method for analyzing aircraft flight data, the method comprising:

(i) receiving flight data for measurements of each of P selected parameters {m(t;k;q)} (k=1, . . . , P) at each of N selected times ($t=t_n$) (n=n0, . . . , n0+N−1; N≧2) for one or more selected flights (q) of one or more aircraft;

(ii) for each continuous-valued parameter p(t;k1) of each flight, numbered k1=1, . . . , K1 (K1≧0), and for a selected sequence of the times $t=t_n$ ($n=n_0$, n0+1, . . . , n=n0+N−1, providing a polynomial approximation p(t; k1; app)= a ($t_{n0}$;k1)+b ($t_{n0}$;k1)·($t-t_{n0}$)+c($t_{n0}$;k1).$(t-t_{n0})^2$+$e(t_{n0}$;k1), where e($t_{n0}$;k1) is an error term, whose sum of the squares d($t_{n0}$;k1)=$(N-3)^{-1}*\Sigma e(t_n;k1)^2$, is minimized by the choice of the terms a($t_{n0}$;k1), b ($t_{n0}$;k1) and c($t_{n0}$;k1);

(iii) forming vectors $A=\{a(t_{n0};k1)\}_{n0}$, $B=\{b(t_{n0};k1)\}_{n0}$, $C=\{c(t_{n0};k1)\}_{n0}$, and $D=\{d(t_{n0};k1)\}_{n0}$, forming an M1×1 vector E1 including a first order statistic m1(v), a second order statistic m2(v), a minimum value min(v) and a maximum value max(v) for each of the vectors v=A, v=B, v=C and v=D;

(iv) for each discrete-valued parameter, numbered k2=1 . . . , K2 (K2≧0) and having L(k2) discrete values, and for the selected sequence of times, forming an L(k2)×L(k2) matrix whose entries are the number of transitions between any two of the L(k2) discrete values of this parameter, dividing each of the original diagonal entries by a sum of the original diagonal entries of the L(k2)×L(k2) matrix to form a modified L(k2)×L(k2) matrix, and forming an L×1 vector E2 of entries from the modified L(k2)×L(k2) matrices, where L is the sum of the values $L(k2)^2$;

(v) forming an M×1 data vector E with entries including m1(v), m2(v), min(v) and max(v) for each of the vectors v=A, v=B, v=C and v=D, and including the entries of the modified L×1 vector, where M=M1+L;

(vi) computing a covariance matrix F=cov(E);

(vii) computing eigenvalues, λ=λ1, λ2, . . . , λM, for an equation F·V(λ)= λV(λ), where λ1≧λ2≧ . . . ≧λM; and (viii) computing a transformed matrix G=DM·F, where DM is a selected data matrix.

2. The method of claim 1, further comprising:

providing at least one sub-sequence of at least one of said values m($t_n$;k1q), and computing a selected linear combination of one or more of said values m($t_n$;k1q) in the sub-sequence;

comparing the computed linear combination of said values with a reference range of values for the computed linear combination; and when the computed linear combination of said values does not lie within the reference range, interpreting this condition as indicating that at least one of said parameter values in the sub-sequence is unacceptable.

3. The method of claim 2, further comprising:

when said computed linear combination of said values lies within said reference range, interpreting this condition as indicating that said values in said sub-sequence are acceptable.

4. The method of claim 1, further comprising computing an atypicality score $A_q$, defined as $$A_q = (1/(M'-3))\sum_{j=1}^{M'} (G_{qj})^2/\lambda'_j,$$

where $G_{qj}$ is an entry in said matrix G and {λ'1, λ2, . . . , λ'M'} is a selected subset of said eigenvalues {λ1, λ2, . . . , λ'M'}, with M'≦M.

5. The method of claim 4, further comprising comparing said computed atypicality score $A_q$ with a histogram of reference atypicality scores for said selected phase for a collection of at least one reference flight.

6. The method of claim 4, further comprising:

when said atypicality score $A_q$ is greater than a selected percentage, PCT, of all atypicality scores in said histogram, interpreting this condition as indicating that a selected phase (ph) for said selected flight is atypical, as compared to a percentage of said reference atypicality scores, where PCT is a selected number at least equal to 80 percent.

7. The method of claim 6, further comprising choosing said selected percentage PCT from a group of percentages consisting of 80 percent, 90 percent, 95 percent and 99 percent.

8. The method of claim 6, further comprising selecting said phase of said selected flight from among the phases pre-takeoff taxi, pre-takeoff position, takeoff, low altitude ascent, high altitude ascent, cruise, high altitude descent, low altitude descent, runway approach, touchdown and post-touchdown taxi.

9. The method of claim 4, further comprising computing a p-value associated with said atypicality score $A_q$, defined as $$p(q;ph)=F1\cdot F2/(F3\cdot F4\cdot F5),$$

$$F1=|A_q|^{(R-M-1)}$$

$$F2=\exp(-(1/2)\ \mathrm{trace}(\Sigma^{-1} A_q))$$

$$F3=2^{-MR}*\pi^{M(M-1)/4}$$

$$F4=|\Sigma|^{1/2R}$$

$$F5=\Pi^{M}_{i=1}\Gamma\{(1/2)(R+1-i)\},$$

where r(x) is an incomplete gamma function.

10. The method of claim 9, further comprising:

assigning each of a group of observation vectors U, whose entries are drawn from entries of said transformed matrix G, to one of two or more clusters, using a selected cluster analysis procedure;

for each modified cluster, providing a cluster membership score CMS(q;ph) that is a strictly monotonic function of the number of observation vectors U in the cluster divided by the total number of observation vectors in all clusters; and computing a global atypicality score, GAS, defined as GAS(q;ph)=w*Fn{p(q;ph)}+(1−w)*Fn{CMS(q;ph)}, where Fn is a selected monotonic function and w is a selected weight lying between 0 and 1.

11. The method of claim 10, further comprising selecting said monotonic function Fn to be Fn{s}=$-\log_z$\{s\}, where z is a selected number greater than 1.

12. The method of claim 10, wherein said selected cluster analysis procedure comprises:

(1) providing an initial set of at least two clusters (2) providing a cluster centroid for each cluster;

(3) assigning each of said group of observation vectors U, whose entries are drawn from entries of said transformed matrix G, to the cluster for which a distance from the centroid to said vector U is a minimum among all centroids;

(4) computing a modified centroid for each cluster from said vectors U assigned to the cluster;

(5) assigning each of said vectors U to a modified cluster associated with the modified centroid for which the distance from the modified centroid to said vector U is a minimum among the distance for all modified centroids;

(6) repeating steps 3, 4 and 5 until at least one of two conditions is met: (i) the number of iterations is greater that a maximum allowed number of iterations, or (ii) the number of flights that change cluster membership between iterations is below a selected threshold; and (7) for each modified cluster, providing said cluster membership score CMS(q;ph).

13. The method of claim 10, further comprising:

comparing said computed GAS for said computed atypicality score $A_q$ with GAS scores for at least first, second and third atypicality scores $A_q$; and estimating a level of atypicality for the first computed atypicality, based upon number of GAS that are less than the first computed GAS and number of GAS that are greater than the first computed GAS.

14. The method of claim 10, further comprising:

when said computed GAS for said computed atypicality score $A_q$ lies in a selected atypicality range, interpreting this condition as indicating that said flight parameter values for at least one phase ph for said flight number q are atypical.

15. The method of claim 10, further comprising:

when said computed GAS for said computed atypicality score $A_q$ does not lie in a selected atypicality range, interpreting this condition as indicating that at least one of said flight parameter values for at least one phase ph for said flight number q is not atypical.

16. The method of claim 10, wherein said selected cluster analysis procedure comprises a hierarchical cluster analysis procedure.

17. The method of claim 1, further comprising:

including in said vector E1 at least one of: (i) a sequence of beginning values, denoted begin(v), for each of said vectors v=A, v=B, v=C and v=D, and (ii) a sequence of ending values, denoted end(v), for each of said vectors v= A, v=B, v=C and v=D.

* * * * *